3,022,315
PREPARATION OF CYCLIC SULFITES

William A. Rogers, Jr., Lake Jackson, and James E. Woehst and Robert M. Smith, Freeport, Tex., assignors to The Dow Chemical Company, Midland, Mich., a corporation of Delaware
No Drawing. Filed Nov. 13, 1956, Ser. No. 621,547
8 Claims. (Cl. 260—327)

This invention relates to a process for the preparation of cyclic sulfites and more particularly to the preparation of cyclic sulfites by the reaction of an epoxide with sulfur dioxide in the presence of an ion exchange resin as a catalyst.

The cyclic sulfites are relatively new compounds which are finding new uses in the chemical industry. Heretofore, no simple or economical method for the preparation of these sulfites was known by which these cyclic sulfites could be prepared in commercial amounts and made available to industry to meet the ever increasing demand.

It is, therefore, a principal object of this invention to provide a method for the preparation of these sulfites by which commercial amounts of the cyclic compounds can be prepared economically.

The above and other objects can be accomplished by the invention, which comprises reacting an epoxide having a general formula:

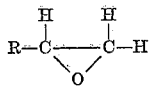

where R represents a member of the group consisting of alkyl and haloalkyl radicals having from 1 to 4 carbon atoms, a phenyl radical, and hydrogen with sulfur dioxide in the presence of an anion exchange resin at a temperature in the range of 70° to 140° C. and a pressure of at least 75 pounds per square inch for a length of time from 1 to 24 hours. A yield of the sulfite up to 99 percent may be obtained. The resin does not lose its activity and may be used numerous times without reprocessing or regeneration.

The reaction in the present process comprises the addition of sulfur dioxide to the epoxy group to form the sulfite and may be illustrated by the following equation:

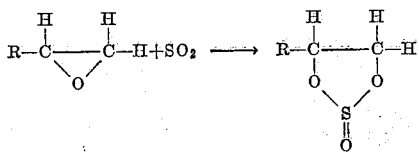

where R is a radical as defined above. Theoretically one mole of sulfur dioxide is required for each mole of the epoxide, but it is preferred to use from a 20 to 30 percent stoichiometric excess. The excess of sulfur dioxide retards the polymerization of the epoxide.

Illustrative examples of the epoxides which may be used in the preparation of the corresponding sulfide are ethylene oxide, propylene oxide, butylene oxide, epichlorohydrin, and styrene oxide.

Both the weakly basic and strongly basic ion exchange resins are effective in catalyzing the reaction. Examples of the resins which are effective are the strongly basic quaternary ammonium type ion exchange resins, such as described in the United States Letters Patent Numbers 2,591,573, 2,614,099, 2,597,494, and 2,597,440, and the weakly basic types, such as described in United States Letters Patent Numbers 2,341,907, 2,546,938, 2,591,574, 2,642,417, and 2,597,493. These resins may be in either their salt or basic form.

The reaction may be carried out in a batch or a continuous process. In a batch operation, the epoxide and the anion exchange resin catalyst may be placed in an agitated reactor where the epoxide is reacted with sulfur dioxide which is used to pressurize the reactor. As the reaction proceeds, the pressure in the reactor will decrease and when the reaction is completed, no further drop in pressure will be obtained. The amount of the resin required to catalyze the reaction is relatively small. An amount of catalyst equal to about 0.1 weight percent of the epoxide charged is operative, but the rate of reaction is slow with this small amount of catalyst. It is preferred to use from 4 to 8 weight percent of resin based on the weight of reacting epoxide. While a slightly more rapid rate of reaction may be obtained when the amount of catalyst employed is increased from 6 to 18 weight percent, no appreciable benefit is realized by increasing the amount above 18 weight percent. In a continuous process, it is preferred to use a reactor pressurized with sulfur dioxide containing a fixed bed of resin and to pass the epoxide through the bed at a rate such that the required reaction time is provided.

Although reaction temperatures as low as 70° C. and as high as 140° C. may be used, a temperature in the range of 90° to 120° C. is preferred. The rate of reaction greatly increases with an increase in temperature, but the reaction temperature employed is limited by the stability of the ion exchange resins. Most of these resins will begin to decompose at temperatures above 140° C. When the reaction is maintained at 140° C. or below, no apparent decomposition of the anion exchange resin is obtained and the resin will not lose its activity rapidly.

A small change in reaction pressure will not greatly affect the rate of reaction or the yields obtained. However, to obtain good yields, it is necessary to employ a reaction pressure of at least 75 pounds per square inch. A reaction pressure in the range of 150 to 1000 pounds per square inch is generally used. In a batch operation, it is preferred to operate at a pressure in the range of 300 to 1000 pounds per square inch. While in a continuous operation, a pressure in the range of 150 to 300 pounds per square inch is preferred. Slightly better yields may be obtained when the pressure is increased above the preferred ranges, but the benefit gained in yields is offset by the additional costs required to operate at higher pressures. Due to the cost of operation at high pressure, the practical maximum operating pressure for both the batch and continuous operation is around 2,000 pounds per square inch.

The reaction time required to obtain substantial conversion of the epoxide to a sulfite will depend upon the epoxide reacted. In a batch reactor, the completion of the reaction is characterized by no further pressure drop, but in a continuous process this method may not be used to determine the completion of the reaction, since a constant pressure of sulfur dioxide is maintained. Substantial proportions of some of the epoxides may be converted to the sulfite in a reaction time as short as 1 hour, while others may require up to around 24 hours. A reaction time in the range of 3 to 12 hours is generally sufficient for most of the epoxides.

The cyclic sulfite product may be recovered from the reaction according to the various techniques which are apparent to those skilled in the art. A convenient method is to recover the product by distillation after it is separated from the catalyst. Vacuum distillation may be used to keep the product from decomposing upon heating.

The following examples further illustrate the invention.

Example I

Into a one gallon stainless steel reactor equipped with a heating jacket and an agitator was charged 500 grams of ethylene oxide and 40 grams of a quaternary ammonium type anion exchange resin where the tertiary amine was dimethylethanol amine such as described in United States Letters Patent Number 2,614,099 and similar to the product sold by The Dow Chemical Company under the trademark "Dowex 2." The resin was in the chloride salt form. The agitator was started and 793 grams of sulfur dioxide were added. The reactor was slowly heated to 106° C. and maintained at this temperature for a period of about 8 hours. A maximum pressure of 200 pounds per square inch developed which gradually diminished. The reactor was then cooled, the pressure bled off, and the reaction product separated from the ion exchange resin. Distillation of the reaction product resulted in obtaining 500 grams of ethylene sulfite and 5 grams of residue. This product represented a 42 percent conversion of the epoxide and a yield of 99 percent based upon the ethylene oxide converted.

*Example II*

The reactor and ion exchange resin described in Example I was used to react propylene oxide with sulfur dioxide. The reactor was charged with 2720 grams of propylene oxide and 100 grams of the ion exchange resin. The agitator was started and 2260 grams of sulfur dioxide were added. The reactor was heated to 105° C. and maintained at this temperature for 12 hours. A maximum pressure of 155 pounds per square inch was obtained which decreased as the reaction proceeded.

The reaction product was separated from the ion exchange resin by filtration and was distilled, yielding 1870 grams of propylene sulfite and about 700 grams of a higher boiling substance. The propylene sulfite distilled off at about 61° C. at 10 millimeters of mercury pressure. The density and the refractive index at 22° C. were 1.269 and 1.437, respectively.

*Example III*

The reactor and ion exchange resin described in Example I was used to react epichlorohydrin with sulfur dioxide. The reactor was charged with 908 grams of epichlorohydrin, 40 grams of the anion exchange resin, and 680 grams of sulfur dioxide. The reactor was heated to 105° C. and maintained at that temperature for 12 hours during which time the pressure dropped from 160 pounds per square inch to atmospheric with the greatest drop occurring in the first three hours.

The reaction product was separated from the anion exchange resin and distilled giving 497 grams of a product having a boiling point of 82.5°–83.5° C. at 10 mm. of Hg pressure and 105 grams of a tarry residue. Infrared analysis showed that the product was chloropropylene sulfite.

*Example IV*

The reactor and ion exchange resin described in Example I were used to react styrene oxide with sulfur dioxide. The reactor was charged with 908 grams of styrene oxide, 40 grams of the anion exchange resin, and 1135 grams of sulfur dioxide. The reactor was heated to 100° C. and maintained at this temperature for about 14 hours during which time the pressure dropped from 300 to 175 pounds per square inch.

Infrared analysis showed the presence of styrene sulfite. However, attempts to separate the styrene sulfite from the reaction product by distillation were unsuccessful.

What is claimed is:

1. A process for the preparation of a monomeric cyclic sulfite having a general formula:

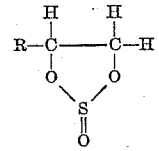

where R represents a member of the group consisting of alkyl and haloalkyl radicals having from 1 to 4 carbon atoms, a phenyl radical, and hydrogen, which comprises reacting an epoxide having a general formula:

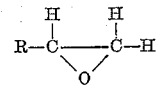

wherein R represents a member of the group as described above with sulfur dioxide in the presence of a synthetic anion exchange resin at a temperature in the range of 70° to 140° C. and a pressure of at least 75 pounds per square inch.

2. A process according to claim 1 wherein the temperature is in the range of 90° to 120° C. and the pressure is in the range of 150 to 1000 pounds per square inch.

3. A process for the preparation of ethylene sulfite which comprises reacting ethylene oxide with sulfur dioxide in the presence of a synthetic anion exchange resin at a temperature in the range of 70° to 140° C. and a pressure of at least 75 pounds per square inch.

4. A process according to claim 3, wherein the temperature is in the range of 90° to 120° C. and the pressure in the range of 150 to 1000 pounds per square inch.

5. A process for the preparation of propylene sulfite, which comprises reacting propylene oxide with sulfur dioxide in the presence of a synthetic anion exchange resin at a temperature in the range of 70° to 140° C. and a pressure of at least 75 pounds per square inch.

6. A process according to claim 5, wherein the temperature is in the range of 90° to 120° C. and the pressure is in the range of 150 to 1000 pounds per square inch.

7. A process for the preparation of styrene sulfite, which comprises reacting styrene oxide and sulfur dioxide in the presence of a synthetic anion exchange resin at a temperature in the range of 70° to 140° C. and a pressure of at least 150 pounds per square inch.

8. A process according to claim 7, wherein the temperature is in the range of 90° to 120° C. and the pressure is in the range of 150 to 1000 pounds per square inch.

References Cited in the file of this patent

UNITED STATES PATENTS

| | | |
|---|---|---|
| 2,413,405 | Campbell et al. | Dec. 31, 1946 |
| 2,684,977 | Viard | July 27, 1954 |

FOREIGN PATENTS

| | | |
|---|---|---|
| 1,104,014 | France | June 8, 1955 |
| 670,159 | Great Britain | Apr. 16, 1952 |

OTHER REFERENCES

The Chemical Age, vol. 68, pages 561 to 564 (1953).